April 1, 1941.   R. E. DAVIS   2,236,525
GAS DETECTOR
Original Filed Jan. 2, 1931

R. E. Davis   Inventor

By  Jesse P. Stone
    &
    Lester B. Clark
                Attorneys

Patented Apr. 1, 1941

2,236,525

UNITED STATES PATENT OFFICE 2,236,525

GAS DETECTOR

Robert E. Davis, Houston, Tex.

Refiled for abandoned application Serial No. 506,173, January 2, 1931. This application November 27, 1939, Serial No. 306,342

1 Claim. (Cl. 261—104)

My invention relates to a device for giving an odor to gas ordinarily having little odor, whereby the presence of the gas can be detected.

It is an object of the invention to provide a detachable device which may be easily connected within a gas line and transmit thereto an odorant thus making it possible to detect the presence of the gas.

Another object of the invention is to provide a particularly effective means of controlling the amount of odorant transmitted to the gas line.

My invention also has for an object to provide a particularly effective means of transmitting the vapor or odiferous substance to the gas so that it may be effective for long periods of time.

My invention is adapted particularly for giving an odor to natural gas which ordinarily has no odor, or at least such a slight odor that it is not easily noticed. Accidents due to the presence of gas which can not be detected by ordinary means are very common and it is one of the main objects of the invention to provide a means of transmitting to the gas an odor whereby it can be detected, which device may be connected to the gas line by the consumer. While the invention is capable of being employed in the large mains whereby the total volume of gas is filled with the odorant it is particularly adapted for use by the consumer on the branch line running from the meter to the building in which the gas is consumed.

The present application is a refiling of my prior abandoned application Serial No. 506,173, filed January 2, 1931.

In the drawing herewith I have shown in Fig. 1 a side elevation of a container embodying my invention, the same being shown as connected to a gas line, said line and parts of the container being broken away in central vertical section.

Figure 1:
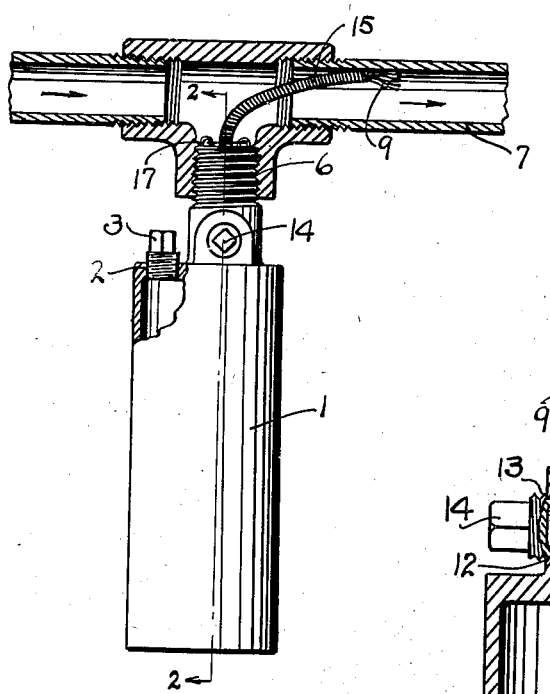
Figure 2:
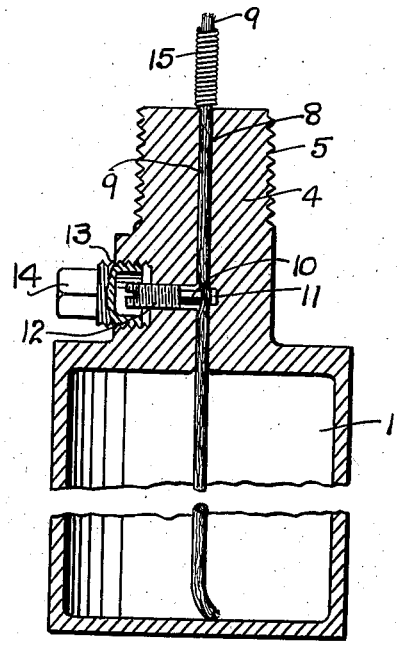
Fig. 2 is a vertical section on the line 2—2 of Fig. 1.

In carrying out my invention I provide a container 1 having some odiferous substance which is easily vaporized. The exact substance employed is immaterial, there being several commercial substances on the market which are generally of a light hydrocarbon content and giving to the gas a decided odor. The container may be cylindrical as shown or of any desired shape. I provide at one end thereof a threaded opening 2 to receive a plug 3, which may be removed to allow the replenishing of the material within the container.

On one end of the container I provide a shank 4, which is threaded at 5 to be coupled within a T-shaped fitting 6, forming a part of the pipe 7, through which the gas may flow.

The shank 4 has axially thereof a duct or channel 8 to receive a wick 9, said wick may be of any desired shape, and it is adapted to extend to a point adjacent the bottom of the container and be saturated with the liquid in said container and to feed said liquid by capillary attraction into the gas line.

The amount of liquid passing from the container through the wick may be accurately adjusted by means of a clamping bolt 10 which extends radially into the shank 4, and is adapted to bear against the wick 9. A recess 11 opposite the clamping bolt 10 is adapted to receive a wick when it is compressed by means of said bolt. Said bolt is threaded at 12 within the shank and adapted to be adjusted through the screwing of said bolt into position. The outer end of the clamping bolt is received within a recess 13 in a cap or plug 14 screwed into the shank 4 about the head of the clamping bolt.

The outer end of the wick 9 is shown as being wound about by a wire 15, which protects the wick and adds resiliency thereto so that in the screwing of the shank 4 into the coupling 5 the wick will not become knotted or tangled. Furthermore, a larger area of exposure to the gas may be thus provided. The inner end of the wire is connected to staples or projections 17 at the upper end of the shank.

Figure 3:
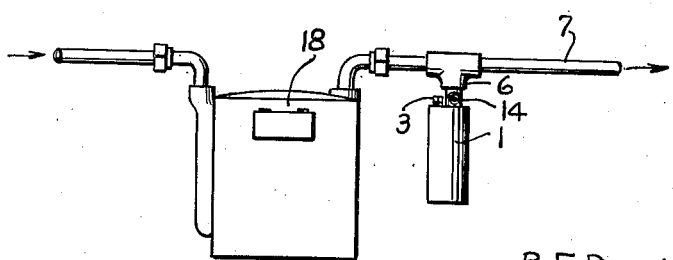
Fig. 3 is an assembly view illustrating the application of the invention adjacent the usual gas meter.

In using my device the container may be coupled to the flow line 7 for the gas at a point adjacent the gas meter 18, as shown in Fig. 3. It will thus be seen that the gas having passed the meter will come into contact with the wick 9 and the evaporation of the odiferous liquid from the wick will carry the vapor along with the gas and give to the same an odor whereby the presence of the gas may be detected. In case a leak occurs at any point along the consumer's line, the consumer will become at once aware of the same and the leak may be corrected before any danger to life or property occurs.

It will be seen that my device is particularly adapted for this purpose for the reason that it may be secured within the line very readily and the amount of evaporation of the liquid into the gas line will depend upon the rate of flow of gas into the line and during the periods of the day in which little gas is flowing in the line there will be very little evaporation, the amount of evaporation depending upon the rate of flow of gas.

The device is of exceedingly simple construction and the amount of vapor transmitted into the gas line may be quite accurately regulated through the adjustment of the clamping screw 10. When thus regulated to advantage the device may be employed for long periods of time. While I have shown the device as being suspended on the lower side of the pipe it may be understood that the structure may be placed in any position relative to the pipe and regulated so that the desired amount of vapor will be absorbed in the gas. The invention lies particularly in the advantageous structure of my device whereby it may be adapted for use in the manner stated.

What is claimed is:

A gas odorizer including a liquid odorant container, means to attach said container to the gas pipe line, a wick projecting from said container into the pipe, the length of the wick projecting into the pipe being greater than the inside diameter of the pipe so that it is caused to bend over and extend along the pipe, and a spring means tending to oppose such bending and support the wick in a position extending across the pipe so that a maximum wick surface is exposed to the gas flow in the pipe.

ROBERT E. DAVIS.